(12) United States Patent
Lu

(10) Patent No.: US 10,878,052 B2
(45) Date of Patent: *Dec. 29, 2020

(54) BLOCKCHAIN-BASED CROSS-CHAIN DATA OPERATION METHOD AND APPARATUS

(71) Applicant: Advanced New Technologies Co., Ltd., Grand Cayman (KY)

(72) Inventor: Zhonghao Lu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,383

(22) Filed: Jul. 26, 2019

(65) Prior Publication Data

US 2020/0034395 A1    Jan. 30, 2020

(30) Foreign Application Priority Data

Jul. 27, 2018    (CN) .......................... 2018 1 0847141

(51) Int. Cl.
*G06F 16/955* (2019.01)
*G06F 16/953* (2019.01)
*H04L 9/06* (2006.01)

(52) U.S. Cl.
CPC .......... *G06F 16/955* (2019.01); *G06F 16/953* (2019.01); *H04L 9/0637* (2013.01); *H04L 9/0643* (2013.01); *H04L 2209/38* (2013.01)

(58) Field of Classification Search
CPC . H04L 9/0637; H04L 9/0643; H04L 2209/38; G06F 16/953; G06F 16/955
See application file for complete search history.

(56) References Cited

U.S. PATENT DOCUMENTS

2013/0144460 A1   6/2013 Ricci
2016/0330034 A1   11/2016 Back et al.
(Continued)

FOREIGN PATENT DOCUMENTS

CN    103229547    7/2013
CN    104935657    9/2015
(Continued)

OTHER PUBLICATIONS

L. Kan, Y. Wei, A. Hafiz Muhammad, W. Siyuan, G. Linchao and H. Kai, "A Multiple Blockchains Architecture on Inter-Blockchain Communication," 2018 IEEE International Conference on Software Quality, Reliability and Security Companion (QRS-C), Lisbon, Jul. 16-20, 2018, pp. 139-145. (Year: 2018).*
(Continued)

*Primary Examiner* — John M Macilwinen
(74) *Attorney, Agent, or Firm* — Fish & Richardson P.C.

(57) ABSTRACT

One or more implementations of the present specification provide a blockchain-based cross-chain data access method. An operation request of a target data is received from a node device of a blockchain of a multi-chain system, wherein the operation request of the target data comprises a URL for performing an operation on the target data, wherein the URL comprises information about an access path of the target data in the multi-chain system, and wherein the multi-chain system comprises a plurality of blockchains. The target data from a target blockchain is determined based on the information of the access path, and an operation is performed on the target data based on the operation request. A result of the operation is transmitted to the node device.

20 Claims, 4 Drawing Sheets

400 udag://mychain-gl.rent.txs/F01abcdefg1/house/area

402 → udag: Protocol name

404 → mychain-gl: Identification of a main chain

406 → rent: Sub chain

408 → txs: Identification of a data retrieval space

410 → F01abcdefg1: Identification information of a target data node

412 → house: Target data

414 → area: Transaction information

(56) References Cited

U.S. PATENT DOCUMENTS

| | | | |
|---|---|---|---|
| 2017/0222814 | A1 | 8/2017 | Oberhauser et al. |
| 2017/0337534 | A1* | 11/2017 | Goeringer ............ G06Q 50/188 |
| 2017/0344580 | A1 | 11/2017 | King |
| 2018/0139056 | A1 | 5/2018 | Imai et al. |
| 2018/0165476 | A1 | 6/2018 | Carey et al. |
| 2019/0188701 | A1* | 6/2019 | Parsons ................ H04L 9/3239 |
| 2019/0228413 | A1* | 7/2019 | Naganuma ........... G06Q 20/407 |
| 2019/0340267 | A1* | 11/2019 | Vo ....................... G06F 16/2365 |
| 2020/0034334 | A1 | 1/2020 | Lu |

FOREIGN PATENT DOCUMENTS

| | | |
|---|---|---|
| CN | 106776820 | 5/2017 |
| CN | 107453896 | 12/2017 |
| CN | 107819582 | 3/2018 |
| CN | 107909369 | 4/2018 |
| CN | 107911421 | 4/2018 |
| CN | 108154366 | 6/2018 |
| CN | 108256864 | 7/2018 |
| CN | 108288159 | 7/2018 |
| TW | 201705696 | 2/2017 |
| TW | 201737110 | 10/2017 |

OTHER PUBLICATIONS

Goli, Harsha. "HD Wallets Explained: From High Level to Nuts and Bolts". pp. 1-5. Mar. 12, 2018. (Year: 2018).*

Berners-Lee et al. RFC 3986. "URI Generic Syntax". Jan. 2005. pp. 1-61. (Year: 2005).*

ChainBLX: New Consensus Algorithm and Sub-Chains Powering Blockchain Stock X-Change. Mar. 6, 2018. pp. 1-5 (Year: 2018).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Hardjono et al., "Towards a Design Philosophy for Interoperable Blockchain Systems," Cornell University Library, 2018, 27 pages.

Jin et al., "Towards a Novel Architecture for Enabling Interoperable Amongst Multiple Blockchains," 2018 IEEE 38th International Conference on Distributed Computing Systems, 2018, 9 pages.

International Search Report and Written Opinion in International Application No. PCT/US2019/043581, dated Oct. 16, 2019 15 pages.

PCT International Search Report and Written Opinion in International Application No. PCT/US2019/043416, dated Sep. 30, 2019, 12 pages.

Robinson, "Requirements for Ethereum Private Sidechains," Cornell University arXiv:1806.09834, Jun. 2018, 34 pages.

cnblogs.com [online], "The process from entering URL to completion of page loading," Apr. 2017, [Retrieved on Mar. 19, 2020], retrieved from URL<https://www.cnblogs.com/dinghuihua/p/6739340.html>, 13 pages (with partial machine translation).

* cited by examiner udag://mychain-gl.rent.txs/F01abcdefg1/house/area

402 → udag: Protocol name

404 → mychain-gl: Identification of a main chain

406 → rent: Sub chain

408 → txs: Identification of a data retrieval space

410 → F01abcdefg1: Identification information of a target data node

412 → house: Target data

414 → area: Transaction information

FIG. 4

BLOCKCHAIN-BASED CROSS-CHAIN DATA OPERATION METHOD AND APPARATUS

CROSS-REFERENCE TO RELATED APPLICATIONS

This application claims priority to Chinese Patent Application No. 201810847141.5, filed on Jul. 27, 2018, which is hereby incorporated by reference in its entirety.

TECHNICAL FIELD

The present specification relates to the field of network communications technologies, and in particular, to a blockchain-based cross-chain data operation method and apparatus.

BACKGROUND

With the development of blockchain technologies, more and more blockchains, including a public blockchain, a consortium blockchain, and a private blockchain, start to emerge. Therefore, interconnection operations between chains and data exchange between chains are increasingly emphasized and needed. However, currently, there is no cross-chain data operation method in a standard format.

SUMMARY

For the previously proposed problem, the present specification provides a blockchain-based cross-chain data operation method, where the method is applied to a multi-chain system constituted of a plurality of blockchains, and includes the following: receiving a target data operation request sent by a node device in any blockchain, where the operation request includes a URL for performing an operation on the target data, and the URL includes information about an access path of the target data in the multi-chain system; performing an operation on the target data based on the operation request; and returning a result of the operation to the node device.

Preferably, the URL is in a data format of a multi-layer structure, and includes: a URL protocol name field, used to record name information of a protocol followed by the URL; a data node domain field, used to record information about an area where a start data node that accesses the target data is located, where the area information includes identification information of a target blockchain where the start data node is located; a data node identifier field, used to record identification information of the start data node; and a data node path field, used to record information about an access path for traversing and accessing the target data starting from the start data node.

Preferably, the URL further includes an operation semantics field, used to record operation semantics information of performing an operation on the target data.

Preferably, the data node domain field further includes the following fields: a protocol field, used to record a protocol name of a blockchain protocol supported by the target blockchain; and an instance field, used to record an instance name of the target blockchain serving as a blockchain instance that supports the blockchain protocol.

Preferably, the data node domain field further includes the following field: a retrieval space field, used to record identification information of data retrieval space used when the target blockchain is queried for the target data by using the identification information of the start data node as a query index.

Preferably, the start data node includes an access link that corresponds to the target data, the access link is used to point to a next data node, and a content format that corresponds to the access link is the data format of the multi-layer structure and includes: a data node domain field, used to record information about an area where a corresponding data node that accesses the access link is located, where the area information includes identification information of a target blockchain where the data node that corresponds to the access link is located; and a data node identifier field, used to record identification information of the data node that corresponds to the access link; and the data node path field further includes the following fields: a link field, used to record a name of the access link; and an attribute field, used to record attribute information of the target data, where the attribute information is used as a retrieval keyword used when the target data is retrieved from the data node.

Preferably, the multi-chain system includes a blockchain system constituted of a main chain and a plurality of sub chains that correspond to the main chain.

Correspondingly, the present specification further provides a blockchain-based cross-chain data operation apparatus, where the apparatus is applied to a multi-chain system constituted of a plurality of blockchains, and includes the following: a receiving unit 202, configured to receive a target data operation request sent by a node device in any blockchain, where the operation request includes a URL for performing an operation on the target data, and the URL includes information about an access path of the target data in the multi-chain system; an operating unit 204, configured to obtain the target data from a target blockchain based on the access path information, and perform an operation on the obtained target data based on the operation request; and a sending unit 206, configured to return a result of the operation to the node device.

Preferably, the URL is in a data format of a multi-layer structure, and includes: a URL protocol name field, used to record name information of a protocol followed by the URL; a data node domain field, used to record information about an area where a start data node that accesses the target data is located, where the area information includes identification information of a target blockchain where the start data node is located; a data node identifier field, used to record identification information of the start data node; and a data node path field, used to record information about an access path for traversing and accessing the target data starting from the start data node.

Preferably, the URL further includes an operation semantics field, used to record operation semantics information of performing an operation on the target data.

Preferably, the data node domain field further includes the following fields: a protocol field, used to record a protocol name of a blockchain protocol supported by the target blockchain; and an instance field, used to record an instance name of the target blockchain serving as a blockchain instance that supports the blockchain protocol.

Preferably, the data node domain field further includes the following field: a retrieval space field, used to record identification information of data retrieval space used when the target blockchain is queried for the target data by using the identification information of the start data node as a query index.

Preferably, the start data node includes an access link that corresponds to the target data, the access link is used to point to a next data node, and a content format that corresponds to the access link is the data format of the multi-layer structure and includes: a data node domain field, used to record information about an area where a corresponding data node that accesses the access link is located, where the area information includes identification information of a target blockchain where the data node that corresponds to the access link is located; and a data node identifier field, used to record identification information of the data node that corresponds to the access link; and the data node path field further includes the following fields: a link field, used to record a name of the access link; and an attribute field, used to record attribute information of the target data, where the attribute information is used as a retrieval keyword used when the target data is retrieved from the data node.

Correspondingly, the present specification further provides a computer device, including a storage device and a processor, where the storage device stores a computer program that can be run by the processor, and the processor performs the blockchain-based cross-chain data operation method when running the computer program.

Correspondingly, the present specification further provides a computer readable storage medium, where a computer program is stored on the computer readable storage medium, and a processor performs the blockchain-based cross-chain data operation method when running the computer program.

By using the blockchain-based cross-chain data operation method and apparatus and the computer device provided in the present specification, the path for accessing the target data in the plurality of blockchains can be indicated by using the access path information, to provide data access path support for the cross-chain data operation, thereby performing an operation on the target data at an end of the access path. An architecture of the plurality of blockchains is not limited to a main chain-side chain architecture, a main chain-multi-sub-chain architecture, or a parallel multi-chain architecture. Inter-chain target data access can be implemented at any time by using an inter-chain data exchange interface.

BRIEF DESCRIPTION OF DRAWINGS

FIG. 4 illustrates a URL included in an access request, according to the present specification.

DESCRIPTION OF IMPLEMENTATIONS

A "blockchain" can be a P2P network system that is achieved by nodes by using a consensus mechanism and has a distributed data storage structure. Data in the blockchain is distributed within "blocks" that are connected in time, a latter block includes a data digest of a previous block, and full backup of data of all or some nodes is achieved based on different consensus mechanisms (for example, a POW, a POS, a DPOS, or a PBFT). The blockchain can include a public blockchain, a consortium blockchain, a private blockchain, etc based on a distribution form of network nodes of the blockchain. In actual applications, especially in actual applications of a consortium blockchain, separate blockchains are usually set for different scenarios, for example, a blockchain used to deal with a house rent service scenario and a blockchain used to deal with a music work copyright use service scenario. In addition, related service sub chains are further developed for a blockchain set in a relatively large application scenario. For example, a main chain of the blockchain used to deal with a house rent service scenario can be connected to a plurality of blockchain sub chains of a plurality of subdivided services of a house rent service, for example, a blockchain sub chain specially used to record a house rent order, and a blockchain sub chain specially used to record details about houses that can be rented. The sub chains are a plurality of instances that follow the previous blockchain main-chain protocol. To realize a multi-blockchain network ecology with value interconnection and information interconnection, cross-blockchain data access or operations become a key way to resolve this problem.

Figure 1:
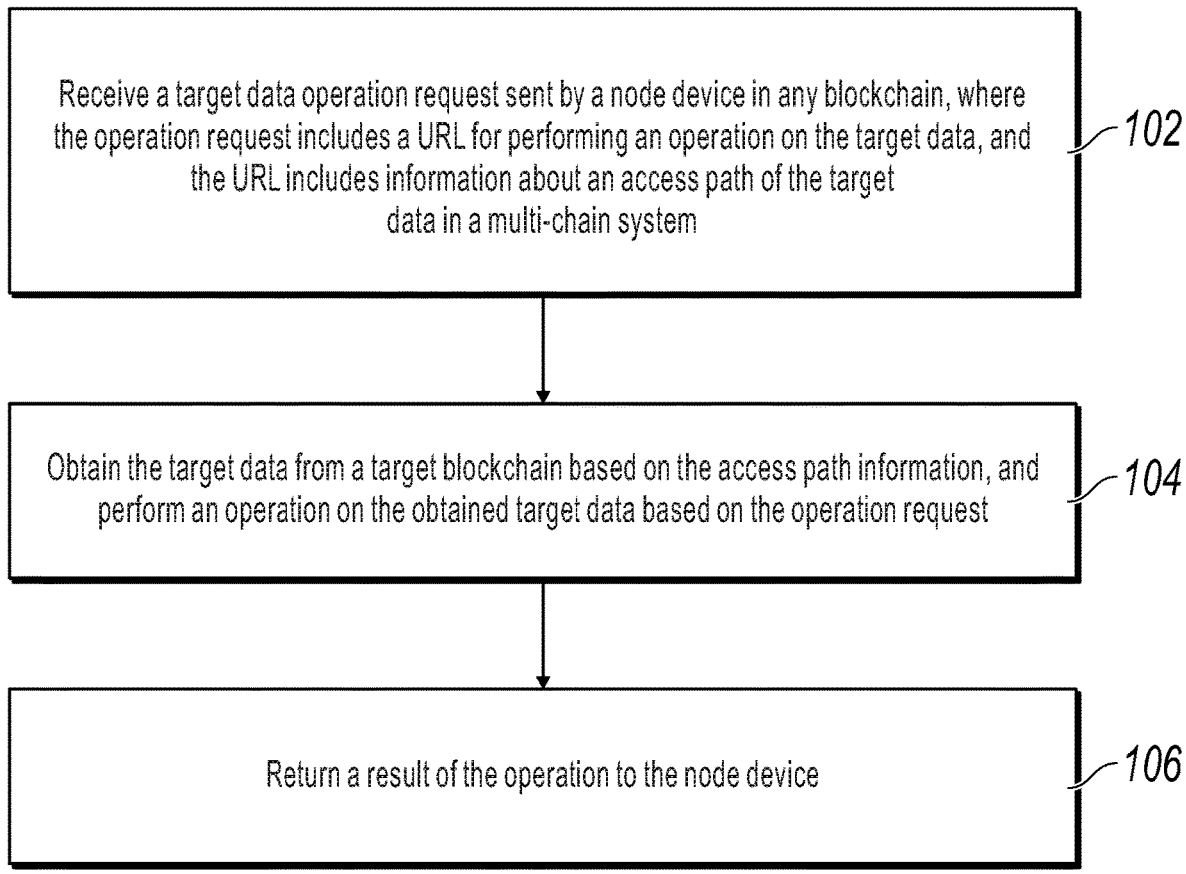
FIG. 1 is a flowchart illustrating a data operation method between a plurality of blockchains, according to an example implementation of the present specification.

To resolve the previous problem, FIG. 1 illustrates a blockchain-based cross-chain data operation method, according to an example implementation of the present specification. The method is applied to a multi-chain system constituted of a plurality of blockchains, and includes the following steps:

Step 102: Receive a target data operation request sent by a node device in any blockchain, where the operation request includes a URL for performing an operation on the target data, the URL includes an access path of the target data in the multi-chain system, and the access path indicates a target blockchain that stores the target data in the plurality of blockchains.

Step 104: Perform an operation on the target data based on the operation request.

Step 106: Return a result of the operation to the node device.

The blockchain-based cross-chain data operation method provided in the previous implementation provides a method for a node device in any blockchain in a blockchain system to access target data in any blockchain (namely, in a distributed ledger of the blockchain) in the blockchain system and perform an executable operation on the target data. The previous operation includes obtaining existing data in a block, creating new data in the block, etc. The URL for performing an operation on the target data includes the access path of the target data in the multi-chain system to accurately obtain the target object data that the operation is performed on. The access path is used to indicate the target blockchain that stores the target data in the plurality of blockchains. An indication method of the target blockchain can include the following: For example, in a parallel network system that includes a plurality of blockchains, a unique identifier (ID) is set for each blockchain, and the access path can include a unique ID of the blockchain where the target data is located, to indicate the target blockchain that stores the target data in the plurality of blockchains. For another example, in a blockchain network system of a main chain-sub chain architecture, a blockchain main chain has a unique ID, and each sub chain has an identification ID in a directory of the main chain. In this case, the access path can include the unique ID of the main chain and the identification ID of the sub chain in the directory of the main chain, to indicate the target blockchain that stores the target data in the plurality of blockchains. A person skilled in the art can further obtain, through extension from the perspective of application scenarios, more field representation methods that can be used to indicate the access path of the target blockchain, and the field representation methods shall fall within the protection scope of the present specification.

According to the cross-chain data operation method provided in the previous implementation, the path for accessing the target data in the plurality of blockchains can be indicated by using the access path information, to provide data access path support for the cross-chain data operation, thereby performing an operation on the target data at an end of the access path. An architecture of the plurality of blockchains is not limited to a main chain-side chain architecture, a main chain-multi-sub-chain architecture, or a parallel multi-chain architecture. Inter-chain target data access can be implemented at any time by using an inter-chain data exchange interface.

In a shown implementation, the URL is in a data format of a multi-layer structure, and includes: a URL protocol name field, used to record name information of a protocol followed by the URL; a data node domain field, used to record information about an area where a start data node that accesses the target data is located, where the area information includes identification information of a target blockchain where the start data node is located; a data node identifier field, used to record identification information of the start data node; and a data node path field, used to record information about an access path for traversing and searching for the target data starting from the start data node.

The URL protocol name field described in the previous implementation is used to record a name of the protocol followed by the method for performing an operation on blockchain data by using the URL provided in the present specification.

The "data node" described in the previous implementation is a storage unit where data is located. In a distributed database of the blockchain, the storage unit of the data node can be a "transaction" or a "block". A transaction-type data node can store content that corresponds to a transaction. It is worthwhile to note that the transaction described in the present specification is a piece of data that is created by a user by using a blockchain client and that needs to be eventually published to the distributed database of the blockchain. The transaction in the blockchain can be classified into a transaction in a narrow sense and a transaction in a broad sense. The transaction in a narrow sense is a value transfer published by the user to the blockchain. For example, in a conventional bitcoin blockchain network, the transaction can be a transfer initiated by the user in the blockchain. The transaction in a broad sense is service data with a service intention that is published by the user to the blockchain. For example, an operator can establish a consortium blockchain based on actual service needs, and deploy some other types of online services (such as a loan application, a rent service, a vehicle scheduling service, an insurance claim service, a credit service, and a medical service) that are irrelevant to a value transfer based on the consortium blockchain. A representation form of the "transaction" is not limited in the present specification, and can be determined based on service natures of the blockchain described in the present specification. A block-type data node can store a block hash value, a block difficulty, a timestamp, a Merkle root hash value, content of all transaction-type data nodes within a block, etc.

The data node domain field described in the previous implementation is used to record the information about the area where the start data node that accesses the target data is located, where the area information includes the identification information of the target blockchain where the data node is located. The start data node is located in the target blockchain regardless of whether the start data node is a transaction-type data node or a block-type data node. The identification information of the target blockchain can be a unique ID of the target blockchain; or when the target blockchain is a sub chain, the identification information is multi-layer identification information obtained by combining a main-chain unique ID and a sub-chain identification ID from the main chain to the sub chain, or identification information determined by using an actual architecture design hierarchy structure of the blockchain system, and other identification representation methods that can be used without ambiguity. Details are omitted here for simplicity.

The data node identifier field described in the previous implementation is used to record the identification information of the start data node. An identifier of the transaction-type data node can be generally a txhash of the transaction, and an identifier of the block-type data node can be generally a block hash of the block. A person skilled in the art can further select or define another data node that facilitates target data access from the perspective of actual service scenario applications. Implementations are not limited here. Correspondingly, an identifier of another data node selected or defined above may not be limited.

It is worthwhile to note that, when a hash value (txhash or block hash) of the transaction or the block content is used as the identifier of the start data node, an access path from the data node domain field to the data node identifier field follows a method for addressing data content based on a hash value of data content. The content-addressable method is a method for accessing immutable content. That is, hashing or other mathematical derivative transformation is performed on the immutable content, and a hash value (or another mathematical derivative digest value) of the immutable content is used as an access address of the immutable content. An addressing protocol that conforms to the content-addressable method can include a distributed file system addressing protocol such as the IPFS. In the technical solutions provided in the present specification, the immutable content is the data node. As such, the target data can be further accessed by accessing the immutable content. The content-addressable method is used to address the target data in the blockchain, and the hash value or another data derivative digest value of the immutable content is used as an access address of the immutable content, to accurately and uniquely locate a location of the start node of the target data in a multi-chain interaction environment. The target data access path provided in the present specification can be used as a standard format of the cross-chain data access method, to provide accurate addressing technical support for data exchange between the pluralities of chains.

The data node path field described in the previous implementation is used to record the information about the access path for traversing and accessing the target data starting from the start data node. For example, the start data node is a transaction-type data node. In this case, when the target data is in content included in the start data node, the target data can be accessed by using attribute information of the target data as the access path information after the start data node, that is, by retrieving the attribute information from the data node. When the target data is located on another node associated with the start data node, the access path information should include link information for linking the two data nodes, so that the traversal process can be switched to a next data node. Likewise, when the start data node is a block-type data node, two similar target data traversal solutions can be used. A person skilled in the art should know that content of a transaction within the block-type data node can be accessed by using a multi-level path access method, for example, by using the content-based access addressing method or the access path in a RESTful format. Implementations are not limited here.

Optionally, the URL can further include an operation semantics field, used to record operation semantics information of performing an operation on the target data. The operation semantics field described in the previous implementation is used to record the operation semantics information of performing an operation on the target data. A format of the operation semantics information can be "[?][op=[get|put|<content operation>]][[&]<other arg>=<arg value>]*", for example, operation semantics information such as "op=get-tx&tx-index=10" or "op=put-tx", where "?" is used for segmentation, [op=[get|put|<content operation>]] is an operation name, <other arg>=<arg value> is an operation parameter, and "&" can be used to connect a plurality of operation parameters. Certainly, the format of the operation semantics field is not limited thereto, and the operation parameter is not necessarily needed. A person skilled in the art can propose adaptive operation semantics based on application scenario needs. It is worthwhile to note that the operation "op=get-tx&tx-index=10" traverses a path of a transaction Merkle tree in a block, arrives at a target transaction whose location serial number is 10, and verifies a hash value on the Merkle path. In addition, although a creation operation "op=put-tx" (creating a new transaction) in the blockchain needs the blockchain nodes to reach a consensus, the blockchain system usually provides a transaction receiving interface. The previous consensus process is encapsulated in the interface, to complete the creation (put) operation. For a URL that does not include an operation semantics field or a URL whose operation semantics field is null, an operation of "obtaining" the target data can be performed by default.

In a shown implementation, the data node domain field further includes the following fields: a protocol field, used to record a protocol name of a blockchain protocol supported by the target blockchain; and an instance field, used to record an instance name of the target blockchain serving as a blockchain instance that supports the blockchain protocol. In a blockchain system of a main chain-sub chain architecture, all blockchains usually support a unified blockchain protocol, and each blockchain can be referred to as an instance of the blockchain protocol. The protocol field and the instance field are used to record the name of the protocol supported by the target blockchain and the name of the instance of the target blockchain in the protocol.

In still another shown implementation, the data node domain field can further include a retrieval space field, used to record identification information of data retrieval space used when the target blockchain is queried for the target data by using the identification information of the data node as a query index. The data retrieval space can be a data index table in the database, and is used to provide space range support for data retrieval. The data retrieval space in the blockchain can be a plurality of data index tables in the blockchain database maintained by the node device of the blockchain, for example, a mapping table that embodies a transaction location (for example, a height of a block where a transaction is located, or a sequence location of a transaction in a block) and a transaction hash value (txhash) in the blockchain distributed database, or a mapping table that embodies a block location (for example, a block height) and a block hash value (block hash) in the blockchain distributed database. The data node identifier can be directly retrieved from the retrieval space by using the data node identifier field as the query index in the data retrieval space, to avoid data node access by traversing all data in the target blockchain one by one. As such, the target data can be accurately and efficiently accessed.

When the data node domain field includes the data retrieval space where the start data node is located, to facilitate retrieval of the data node in the data retrieval space, the data node identifier used as the query index can be a hash digest of content of the data node, such as a transaction hash value (txhash) or a block hash value (block hash), or can be a serial number of a transaction inside a block. A value depends on an attribute of a mapping relationship included in the data retrieval space, and is not limited in the present specification.

In still another shown implementation, the start data node includes an access link that corresponds to the target data. The access link is used to point to a next data node. A content format that corresponds to the access link is the data format of the multi-layer structure, and includes: a data node domain field, used to record information about an area where a corresponding data node that accesses the access link is located, where the area information includes identification information of a target blockchain where the data node that corresponds to the access link is located; and a data node identifier field, used to record identification information of the data node that corresponds to the access link. Therefore, the data node path field further includes the following field: a link field, used to record a name of the access link.

The data node path field described in the previous implementation is used to record the information about the access path for traversing and searching for the target data starting from the start data node. The access path information usually includes attribute information of the target data to facilitate retrieval in the data node. It is worthwhile to note that the start data node can include the access link that corresponds to the target data, the access link is used to point to the next data node, and the next data node can be located in the same blockchain or can be located in different blockchains. A content format that corresponds to the access link can also imitate and follow the multi-layer structure format of the access path for cross-chain data access described in the previous implementation. In other words, the content format also includes a data node domain field and a data node identifier field of the next data node that is linked to.

By using the one or more link fields, any node device in the blockchain system can directly jump over the plurality of blockchains included in the blockchain system to access data to quickly and conveniently complete cross-chain data exchange.

The following uses a case of performing an operation on inter-chain block data in a plurality of consortium blockchains as an application instance of the previous method. For example, a blockchain system includes a plurality of blockchain main chains used for urban administrative management. A main chain of a consortium blockchain is constructed by a plurality of credit institutions such as a large house rent agency, a financial institution, a house rent market behavior management institution, and a residence permit registration management institution based on house rent market transaction and management needs. A unique ID of the main chain of the consortium blockchain in the blockchain system is mychain-gl, and the credit institutions serve as consortium members of the consortium blockchain to participate in behaviors such as consensus and accounting of the consortium blockchain. To subdivide services involved in the house rent market transaction and management process, the consortium blockchain serves as a main chain, and a blockchain sub chain (whose identification ID is "rent") specially used to record a house rent order and a blockchain sub chain (whose identification ID is "house") specially used to record details about houses that can be rented can be developed based on the main chain.

In a shown implementation, in a sub chain "rent", there is a house rent order transaction whose txhash is F01abcdefg1. Detailed content of the transaction whose txhash value is F01abcdefg1 is as follows:

```
{
  "id" : "1000",
  "rentName" : "renter name",
  "@house": "/mychain-gl.rent.txs/F02abcdefg2"//a link name is
"house", and a corresponding content format is a data format of a multi-
layer structure, to point to a transaction-type data node whose txhash value
is F02abcdefg2 in the sub chain "rent"
}
  Detailed content of a transaction whose txhash is F02abcdefg2 in the
same blockchain "rent" is as follows:
{
  "id" : "2000",
  "area" : 89
}
```

In the multi-blockchain system based on house rent market management, the node device in any blockchain can initiate a data operation request to any blockchain regardless of whether the node device is in the main chain or the sub chain. The accessed blockchain expands the path to perform traversal based on the start data node in a data access request, to access the corresponding target data and perform an operation on the target data. In this example, when the blockchain "rent" receives an operation request (get) sent by any node device in the blockchain system for obtaining an area attribute (area) of a house in the transaction whose txhash value is F01abcdefg1, the transaction can be used as the target data node, and a URL included in the access request can be "udag://mychain-gl.rent.txs/F01abcdefg1/house/area". Referring to FIG. 4, FIG. 4 illustrates the URL included in the access request 400, according to the present specification. The URL 400 includes a protocol name 402, an identification 404 of a main chain 404, a sub chain 406, an identification 408 of a data retrieval space, identification information 410 of a target data node, target data 412, and transaction information 414.

"udag" can be used as a protocol name of the URL included in the cross-chain data operation request provided in the present specification. Certainly, the protocol name is not limited to "udag" in the present invention. The ID (mychain-gl) of the main chain can be used as a name of a blockchain protocol supported by all consortium blockchains (including the target blockchain "rent") constructed based on the house rent market transaction and management needs. For example, bitcoin can be used as a protocol name of a bitcoin blockchain. The identification ID of the sub chain "rent" can be used as a name of an instance in the blockchain protocol. Likewise, when a blockchain that receives the access request for the target data is "house", "house" can be used as identification information of an instance in the blockchain protocol. The txs is identification information of corresponding data retrieval space used when the identification information (the hash value F01abcdefg1) of the target data node is used as the query index, and /F01abcdefg1 indicates that the transaction whose hash value is F01abcdefg1 is located in a transaction hash (txhash) mapping table of the data retrieval space by using the content-based addressing method. The transaction is the target data node (or the start data node, where the data accessed in this example is stored in the start data node).

It can be seen that the target data can be accessed from the blockchain main chain to the sub chain then to the data node "the transaction whose transaction hash value is F01abcdefg1" of the sub chain by traversing the data node domain field, the data node identifier field, and the data node path field step by step. As such, the target data "renter name" that corresponds to the target data access request this time can be obtained by retrieving the attribute "rentName" in the start data node. The URL does not include the operation semantics field (or the operation semantics field is null), and directly obtaining the target data indicated by the data node path field can be considered as a particular case of obtaining the operation semantics field that corresponds to the operation. Further, the blockchain "rent" should return the obtained target data to the node device that sends the target data access or acquisition request.

In another shown implementation, when a block hash value of a block where the transaction whose txhash value is F01abcdefg1 is located is F10000000, the block can also be used as the start data node. When the blockchain "rent" receives an operation request sent by any node device in the blockchain system for obtaining a transaction whose location serial number is 10 in the block whose block hash is F10000000, the block can be used as the start data node, and a URL included in the operation request should include "udag://mychain-gl.rent.blockshash/F10000000?op=get-tx&tx-index=10".

"udag" can be used as a protocol name of the URL included in the cross-chain data operation request provided in the present specification. Certainly, the protocol name is not limited to "udag" in the present invention. mychain-gl.rent.blockshash is used as the data node domain field of the access path. /F10000000 is used as a block-type data node identifier field. In this example, the data node path field is null, and an operation is directly performed in the block-type data node. "?op=get-tx&tx-index=10" is the operation semantics field of the URL, and is used to obtain content of the transaction whose location serial number is 10 (a serial number on a leaf node of a transaction Merkle tree in the block is 10) from the block-type data node F10000000. The blockchain "rent" performs an operation of obtaining the target data based on the URL in the operation request, and returns the obtained target data "the content of the transaction whose location serial number is 10" to the node device that sends the target data operation request.

Optionally, when the blockchain "rent" receives an acquisition operation request sent by any node device in the blockchain system for obtaining house area information of a house rent transaction whose location serial number is 10 in a block whose block hash is F10000000, the block can be used as the start data node for accessing the target data, and a URL included in the operation request can be "udag://mychain-gl.rent.blockshash/F10000000/txs/10/house/area".

"udag" can be used as a protocol name of the URL included in the cross-chain data operation request provided in the present specification. Certainly, the protocol name is not limited to "udag" in the present invention. mychain-gl.rent.blockshash is used as the data node domain field of the access path. /F10000000 is used as a block-type data node identifier field. In this example, /txs/10/house/area is used as a data node path, traversal is directly performed in the block-type data node based on the path /txs/10/house/area to traverse from a house link of the transaction whose serial number is 10 on a leaf node in a transaction Merkle tree in the block to another transaction in the blockchain, and target data retrieval with an attribute "area" is performed on the transaction. Likewise, the URL does not include the operation semantics field (or the operation semantics field is null), and directly obtaining the target data indicated by the data node path field can be considered as a particular case of obtaining the operation semantics field that corresponds to the operation. Further, the blockchain "rent" should return the obtained target data to the node device that sends the target data acquisition request.

It can be seen from the data location access and traversal process that a data node at a next location that a link on the access path is linked to is not limited. The link can be linked to a data node in a sub chain (or a main chain) of another blockchain, or can be linked to a data node in the sub chain of the current blockchain. A type of the data node that the link is linked to is also not limited, and the data node can be a transaction-type data node or a block-type data node. In addition, a person skilled in the art should know that there may be more than one link on the access path, and the blockchain can jump between a pluralities of blockchains by traversing locations that the link points to, to address a final location to obtain the target data based on a retrieval attribute.

A person skilled in the art should know that some of the fields included in the data format of the multi-layer structure described in the previous implementation of the present specification can be null in actual use, but it does not affect the protection scope of the present specification.

Figure 3:
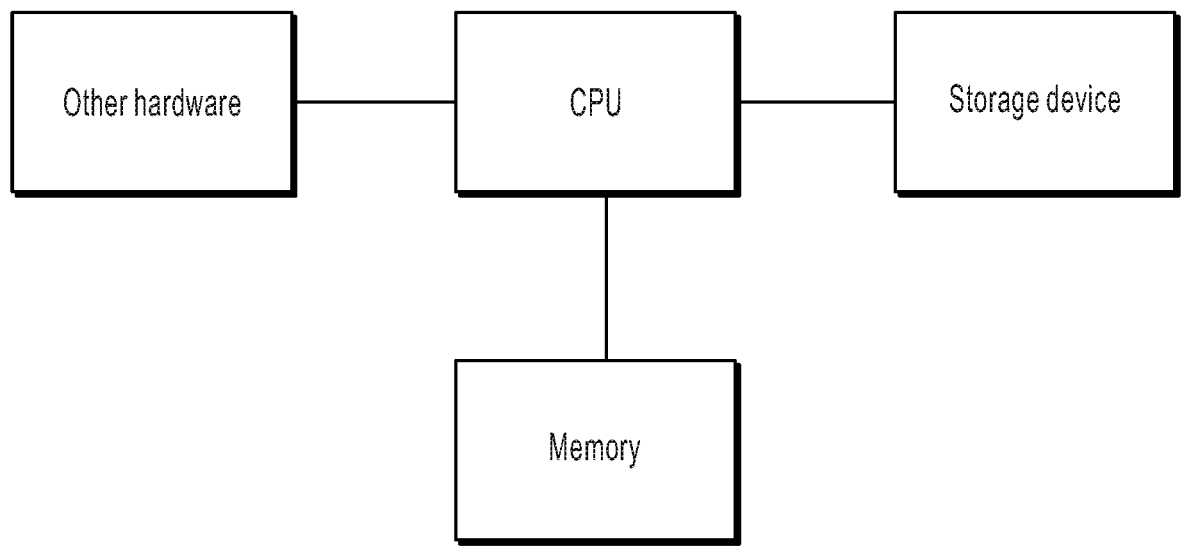
FIG. 3 is a hardware structural diagram illustrating an implementation for running a data operation method or apparatus between a pluralities of blockchains, according to the present specification.

Corresponding to the previous procedure implementation, an implementation of the present specification further provides a blockchain-based data processing apparatus. The apparatus can be implemented by software, can be implemented by hardware, or can be implemented by a combination of hardware and software. Software implementation is used as an example. As a logical apparatus, the software is formed by reading a corresponding computer program instruction and running the instruction in a memory by a central process unit (CPU) in a device where the software is located. In terms of hardware, in addition to a CPU, a memory, and a storage device shown in FIG. 3, the device where the data processing apparatus is located usually further includes other hardware such as a chip for sending and receiving radio signals, and/or other hardware such as a card configured to implement a network communication function.

Figure 2:
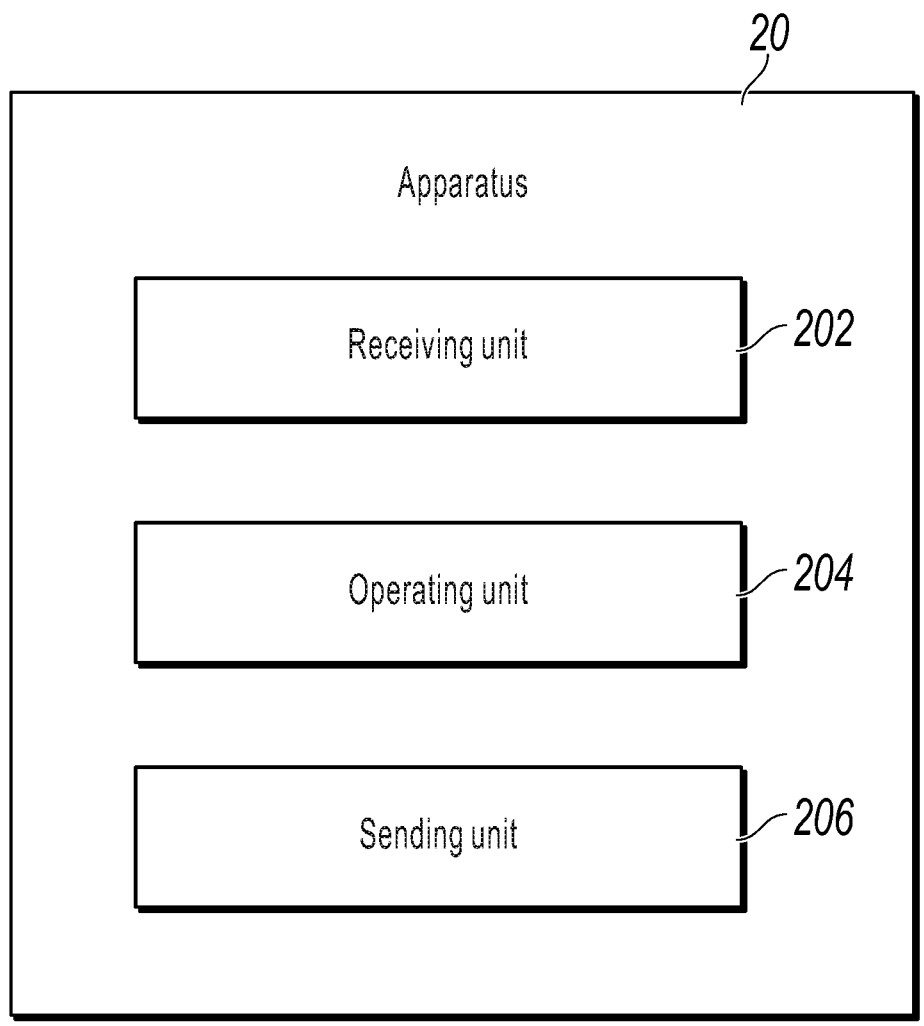
FIG. 2 is a schematic diagram illustrating a data operation apparatus between a plurality of blockchains, according to an example implementation of the present specification.

FIG. 2 illustrates a blockchain-based cross-chain data operation apparatus 20, according to the present specification. The apparatus 20 is applied to a multi-chain system constituted of a plurality of blockchains, and includes the following: a receiving unit 202, configured to receive a target data operation request sent by a node device in any blockchain, where the operation request includes a URL for performing an operation on the target data, and the URL includes information about an access path of the target data in the multi-chain system; an operating unit 204, configured to perform an operation on the target data based on the operation request; and a sending unit 206, configured to return a result of the operation to the node device.

Preferably, the URL is in a data format of a multi-layer structure, and includes: a URL protocol name field, used to record name information of a protocol followed by the URL; a data node domain field, used to record information about an area where a start data node that accesses the target data is located, where the area information includes identification information of a target blockchain where the start data node is located; a data node identifier field, used to record identification information of the start data node; and a data node path field, used to record information about an access path for traversing and accessing the target data starting from the start data node.

Preferably, the URL further includes an operation semantics field, used to record operation semantics information of performing an operation on the target data.

Preferably, the data node domain field further includes the following fields: a protocol field, used to record a protocol name of a blockchain protocol supported by the target blockchain; and an instance field, used to record an instance name of the target blockchain serving as a blockchain instance that supports the blockchain protocol.

Preferably, the data node domain field further includes the following field: a retrieval space field, used to record identification information of data retrieval space used when the target blockchain is queried for the target data by using the identification information of the start data node as a query index.

Preferably, the start data node includes an access link that corresponds to the target data, the access link is used to point to a next data node, and a content format that corresponds to the access link is the data format of the multi-layer structure and includes: a data node domain field, used to record information about an area where a corresponding data node that accesses the access link is located, where the area information includes identification information of a target blockchain where the data node that corresponds to the access link is located; and a data node identifier field, used to record identification information of the data node that corresponds to the access link.

The data node path field further includes the following fields: a link field, used to record a name of the access link; and an attribute field, used to record attribute information of the target data, where the attribute information is used as a retrieval keyword used when the target data is retrieved from the data node.

For details about an implementation process of functions and roles of the units in the apparatus, references can be made to an implementation process of corresponding steps in the previous method. For related parts, references can be made to related descriptions in the method implementation. Details are omitted here for simplicity.

The previously described apparatus implementation is merely an example. The units described as separate parts may or may not be physically separate, and parts displayed as units may or may not be physical modules, may be located in one position, or may be distributed on a plurality of network modules. Some or all of the units or modules can be selected based on actual needs to achieve the objectives of the solutions of the present specification. A person of ordinary skill in the art can understand and implement the implementations of the present application without creative efforts.

The apparatuses, units, or modules described in the previous implementations can be implemented by a computer chip or an entity, or can be implemented by a product with a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the previous method implementation, an implementation of the present specification further provides a computer device, where the computer device includes a storage device and a processor. The storage device stores a computer program that can be run by the processor. When running the stored computer program, the processor performs each step of the blockchain-based cross-chain data operation method in the implementation of the present specification. For a detailed description of each step of the blockchain-based cross-chain data operation method, references can be made to the previous content. Details are omitted here for simplicity.

Corresponding to the previous method implementation, an implementation of the present specification further provides a computer readable storage medium. The storage medium stores a computer program. When running the computer program, a processor performs each step of the blockchain-based cross-chain data operation method in the implementation of the present specification. For a detailed description of each step of the blockchain-based cross-chain data operation method, references can be made to the previous content. Details are omitted here for simplicity.

The previous descriptions are merely preferred implementations of the present specification, but are not intended to limit the present specification. Any modification, equivalent replacement, or improvement made without departing from the spirit and principle of the present specification shall fall within the protection scope of the present specification.

In a typical configuration, a computing device includes one or more processors (CPU), an input/output interface, a network interface, and a memory.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data.

Examples of a computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by the computing device. Based on the definition in the present specification, the computer readable medium does not include transitory computer readable media (transitory media) such as a modulated data signal and carrier.

It is worthwhile to further note that, the terms "include", "comprise", or their any other variants are intended to cover a non-exclusive inclusion, so a process, a method, a product, or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that an implementation of the present specification can be provided as a method, a system, or a computer program product. Therefore, the implementations of the present specification can use a form of hardware only implementations, software only implementations, or implementations with a combination of software and hardware. Moreover, the implementations of the present specification can use a form of a computer program product that is implemented on one or more computer-usable storage media (including but not limited to a disk memory, a CD-ROM, an optical memory, etc.) that include computer-usable program code.

What is claimed is:

1. A computer-implemented method for blockchain-based cross-chain data access, the computer-implemented method comprising:
   receiving, from a node of a first blockchain of a multi-chain system comprising a plurality of different blockchains and including the first blockchain and a target blockchain, an operation request corresponding to target data stored in a target node of the target blockchain,
   wherein the operation request comprises a URL for performing an operation on the target data,
      wherein the URL comprises information about an access path in the multi-chain system to the target data,
         wherein the access path comprises an immutable unique identifier stored by an access path node of the target blockchain,
            wherein the immutable unique identifier is used as an address for accessing the access path node,
            wherein the access path node comprises an access link that corresponds to the target data,
               wherein the access link is used to point to the target node from the access path node,
         wherein the access path further comprises an instance name of an instance of the target blockchain supporting a blockchain protocol, and
         wherein the access path further comprises operation semantics information of performing the operation on the target data;
   obtaining the target data from the target blockchain based on the information about the access path;
   performing the operation on the target data based on the operation request; and
   transmitting a result of the operation to the node of the first blockchain.

2. The computer-implemented method of claim 1, wherein:
   the URL is in a data format of a multi-layer structure; and
   the computer-implemented method further comprises:
      recording, with a URL protocol name field of the URL, name information of a protocol followed by the URL;
      recording, with a data node domain field of the URL, area information corresponding to the access path node accessing the target data, wherein the area information comprises identification information of the target blockchain;
      recording, with a data node identifier field of the URL, identification information of the access path node; and
      recording, with a data node path field of the URL, access path information of the target data traversed and identified starting from the access path node.

3. The computer-implemented method of claim 2, further comprising:

recording, with an operation semantics field of the URL, the operation semantics information of performing the operation on the target data.

4. The computer-implemented method of claim 2, wherein the data node domain field further comprises a protocol field and an instance field; and the method further comprises:
recording, with the protocol field, a protocol name of the blockchain protocol supported by the target blockchain; and
recording, with the instance field, the instance name of the instance of the target blockchain supporting the blockchain protocol.

5. The computer-implemented method of claim 4, wherein the data node domain field further comprises a retrieval space field; and the method further comprises:
recording, with the retrieval space field, identification information of data retrieval space used when the identification information of the access path node is used as a query index to query the target data on the target blockchain.

6. The computer-implemented method of claim 1, wherein a content format corresponding to the access link is in a data format of a multi-layer structure; and the method further comprises:
recording, with a data node domain field of the access link, area information about an area where a corresponding data node that accesses the access link is located, wherein the area information comprises identification information of the target blockchain where the corresponding data node that accesses the access link is located; and
recording, with a data node identifier field of the access link, identification information of the corresponding data node that accesses the access link;
recording, with a link field of the access link, a name of the access link; and
recording, with an attribute field of the access link, attribute information of the target data, wherein the attribute information is used as a retrieval keyword to retrieve the target data.

7. The computer-implemented method of claim 1, wherein the multi-chain system comprises a blockchain system consisting of a main chain and a plurality of subchains corresponding to the main chain.

8. A non-transitory, computer-readable medium storing one or more instructions executable by a computer system to perform operations comprising:
receiving, from a node of a first blockchain of a multi-chain system comprising a plurality of different blockchains and including the first blockchain and a target blockchain, an operation request corresponding to target data stored in a target node of the target blockchain, wherein the operation request comprises a URL for performing an operation on the target data,
wherein the URL comprises information about an access path in the multi-chain system to the target data,
wherein the access path comprises an immutable unique identifier stored by an access path node of the target blockchain,
wherein the immutable unique identifier is used as an address for accessing the access path node,
wherein the access path node comprises an access link that corresponds to the target data,
wherein the access link is used to point to the target node from the access path node,
wherein the access path further comprises an instance name of an instance of the target blockchain supporting a blockchain protocol, and
wherein the access path further comprises operation semantics information of performing the operation on the target data;
obtaining the target data from the target blockchain based on the information about the access path;
performing the operation on the target data based on the operation request; and
transmitting a result of the operation on the target data to the node of the first blockchain.

9. The non-transitory, computer-readable medium of claim 8, wherein:
the URL is in a data format of a multi-layer structure; and
the operations further comprise:
recording, with a URL protocol name field of the URL, name information of a protocol followed by the URL;
recording, with a data node domain field of the URL, area information corresponding to the access path node accessing the target data, wherein the area information comprises identification information of the target blockchain;
recording, with a data node identifier field of the URL, identification information of the access path node; and
recording, with a data node path field of the URL, access path information of the target data traversed and identified starting from the access path node.

10. The non-transitory, computer-readable medium of claim 9, and the operations further comprise:
recording, with an operation semantics field of the URL, the operation semantics information of performing the operation on the target data.

11. The non-transitory, computer-readable medium of claim 9, wherein the data node domain field further comprises a protocol field and an instance field; and the operations further comprise:
recording, with the protocol field, a protocol name of the blockchain protocol supported by the target blockchain; and
recording, with the instance field, the instance name of the instance of the target blockchain supporting the blockchain protocol.

12. The non-transitory, computer-readable medium of claim 11, wherein the data node domain field further comprises a retrieval space field; and the operations further comprise:
recording, with the retrieval space field, identification information of data retrieval space used when the identification information of the access path node is used as a query index to query the target data on the target blockchain.

13. The non-transitory, computer-readable medium of claim 8, wherein a content format corresponding to the access link is in a data format of a multi-layer structure; and the operations further comprise:
recording, with a data node domain field of the access link, area information about an area where a corresponding data node that accesses the access link is located, wherein the area information comprises identification information of the target blockchain where the corresponding data node that accesses the access link is located; and recording, with a data node identifier field of the access link, identification information of the corresponding data node that accesses the access link;

recording, with a link field of the access link, a name of the access link; and recording, with an attribute field of the access link, attribute information of the target data, wherein the attribute information is used as a retrieval keyword to retrieve the target data.

14. The non-transitory, computer-readable medium of claim 8, wherein the multi-chain system comprises a blockchain system consisting of a main chain and a plurality of subchains corresponding to the main chain.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, from a node of a first blockchain of a multi-chain system comprising a plurality of different blockchains and including the first blockchain and a target blockchain, an operation request corresponding to target data stored in a target node of the target blockchain,
wherein the operation request comprises a URL for performing an operation on the target data,
wherein the URL comprises information about an access path in the multi-chain system to the target data,
wherein the access path comprises an immutable unique identifier stored by an access path node of the target blockchain,
wherein the immutable unique identifier is used as an address for accessing the access path node,
wherein the access path node comprises an access link that corresponds to the target data,
wherein the access link is used to point to the target node from the access path node,
wherein the access path further comprises an instance name of an instance of the target blockchain supporting a blockchain protocol, and
wherein the access path further comprises operation semantics information of performing the operation on the target data;
obtaining the target data from the target blockchain based on the information about the access path;
performing the operation on the target data based on the operation request; and
transmitting a result of the operation on the target data to the node of the first blockchain.

16. The computer-implemented system of claim 15, wherein:
the URL is in a data format of a multi-layer structure; and
the operations further comprise:

recording, with a URL protocol name field of the URL, name information of a protocol followed by the URL;

recording, with a data node domain field of the URL, area information corresponding to the access path node accessing the target data, wherein the area information comprises identification information of the target blockchain;

recording, with a data node identifier field of the URL, identification information of the access path node; and recording, with a data node path field of the URL, access path information of the target data traversed and identified starting from the access path node.

17. The computer-implemented system of claim 16, the operations further comprise:
recording, with an operation semantics field of the URL, the operation semantics information of performing the operation on the target data.

18. The computer-implemented system of claim 16, wherein the data node domain field further comprises a protocol field and an instance field; and the operations further comprise:
recording, with the protocol field, a protocol name of the blockchain protocol supported by the target blockchain; and
recording, with the instance field, the instance name of the instance of the target blockchain supporting the blockchain protocol.

19. The computer-implemented system of claim 18, wherein the data node domain field further comprises a retrieval space field; and the operations further comprise:
recording, with the retrieval space field, identification information of data retrieval space used when the identification information of the access path node is used as a query index to query the target data on the target blockchain.

20. The computer-implemented system of claim 15, wherein a content format corresponding to the access link is in a data format of a multi-layer structure; and the operations further comprise:
recording, with a data node domain field of the access link, area information about an area where a corresponding data node that accesses the access link is located, wherein the area information comprises identification information of the target blockchain where the corresponding data node that accesses the access link is located; and recording, with a data node identifier field of the access link, identification information of the corresponding data node that accesses the access link;

recording, with a link field of the access link, a name of the access link; and recording, with an attribute field of the access link, attribute information of the target data, wherein the attribute information is used as a retrieval keyword to retrieve the target data.

* * * * *